United States Patent [19]

Stoll

[11] Patent Number: 4,903,431
[45] Date of Patent: Feb. 27, 1990

[54] TRANSLUCENT PLANT COVER OF FOLDABLE CONSTRUCTION

[75] Inventor: Mark S. Stoll, Deephaven, Minn.

[73] Assignee: Liberty Diversified Industries, Minneapolis, Minn.

[21] Appl. No.: 938,970

[22] Filed: Dec. 8, 1986

[51] Int. Cl.⁴ .................... A01G 13/04; B65D 5/10
[52] U.S. Cl. ............................ 47/28.1; 47/29; 229/110; 229/155
[58] Field of Search ............ 47/26, 27, 28, 29, 30, 47/31, 32, 84, 19; 229/127, 110, 41 C, 155; 206/423

[56] References Cited

U.S. PATENT DOCUMENTS

| 1,704,801 | 3/1929 | Miller | 47/30 |
| 1,747,967 | 2/1930 | Bell | 47/29 |
| 2,062,410 | 12/1936 | Garcia | 47/30 |
| 2,665,523 | 1/1954 | Hardman | 47/28 |
| 3,526,352 | 9/1970 | Swett | 229/41 C |

FOREIGN PATENT DOCUMENTS

| 2376617 | 9/1978 | France | 47/29 |
| 2037555 | 7/1980 | United Kingdom | 47/29 |
| 2104366 | 3/1983 | United Kingdom | 47/26 |

Primary Examiner—Danton D. DeMille
Attorney, Agent, or Firm—Moore & Hansen

[57] ABSTRACT

A device for protecting growing plants constructed from corrugated plastic and folded in the form of a straight or tapered hexagonal column having two hinged lid panels which may be opened to provide ventilation or closed to provide protection for the plant.

22 Claims, 2 Drawing Sheets

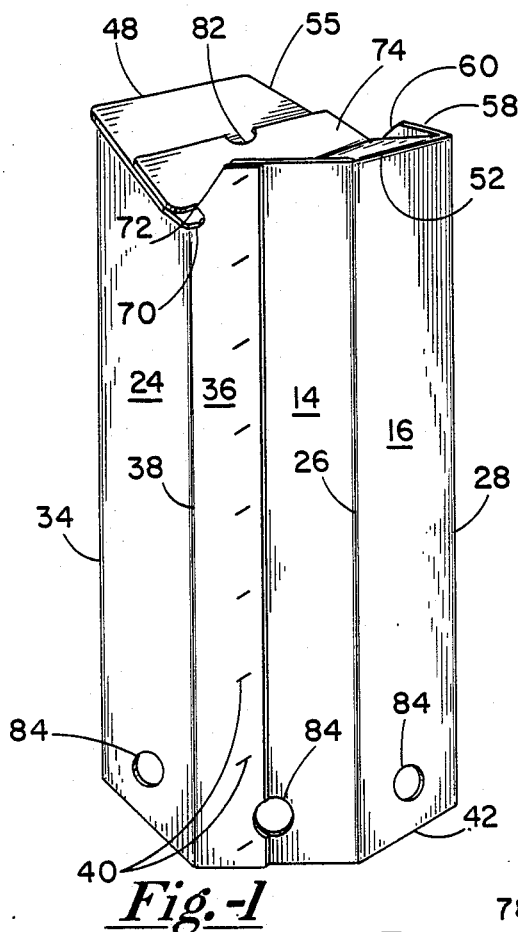
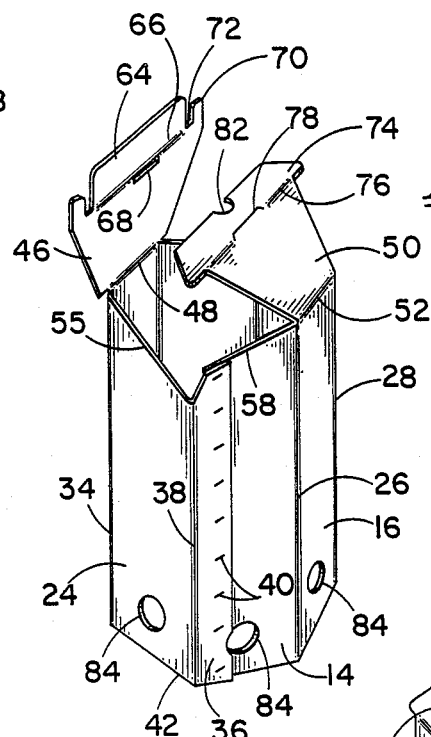
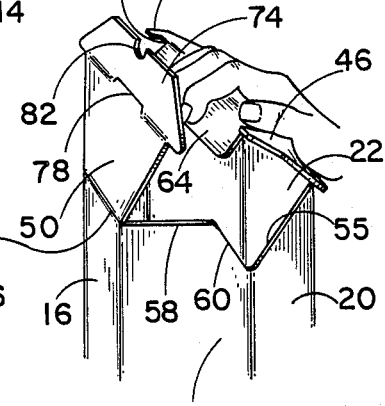
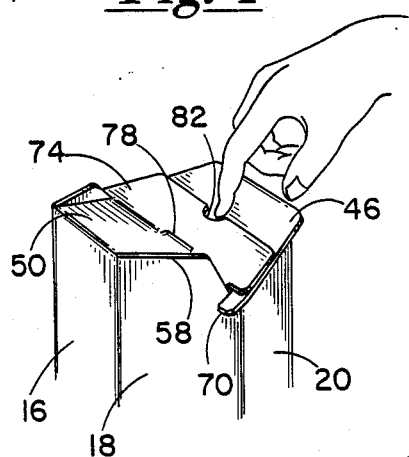
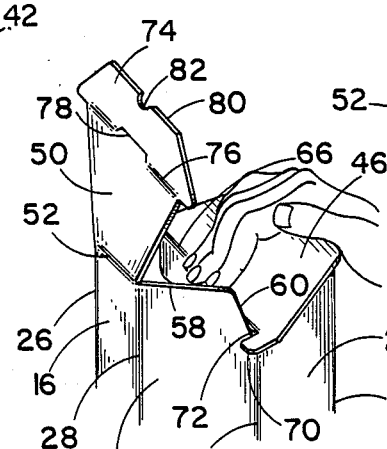
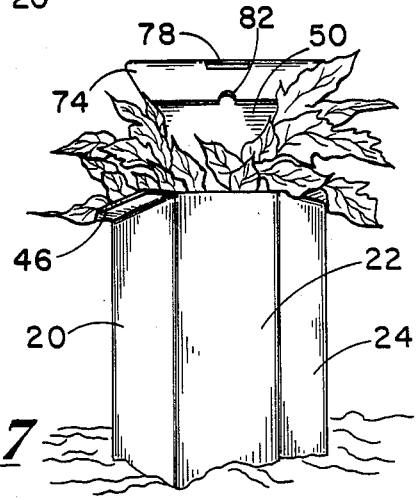
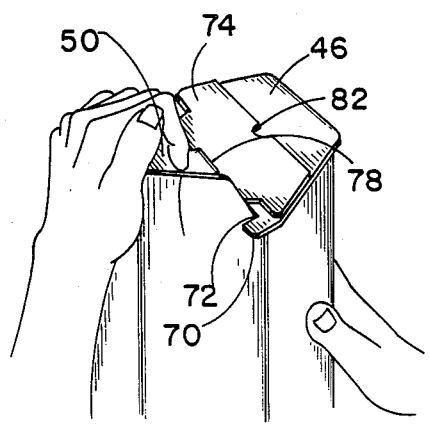

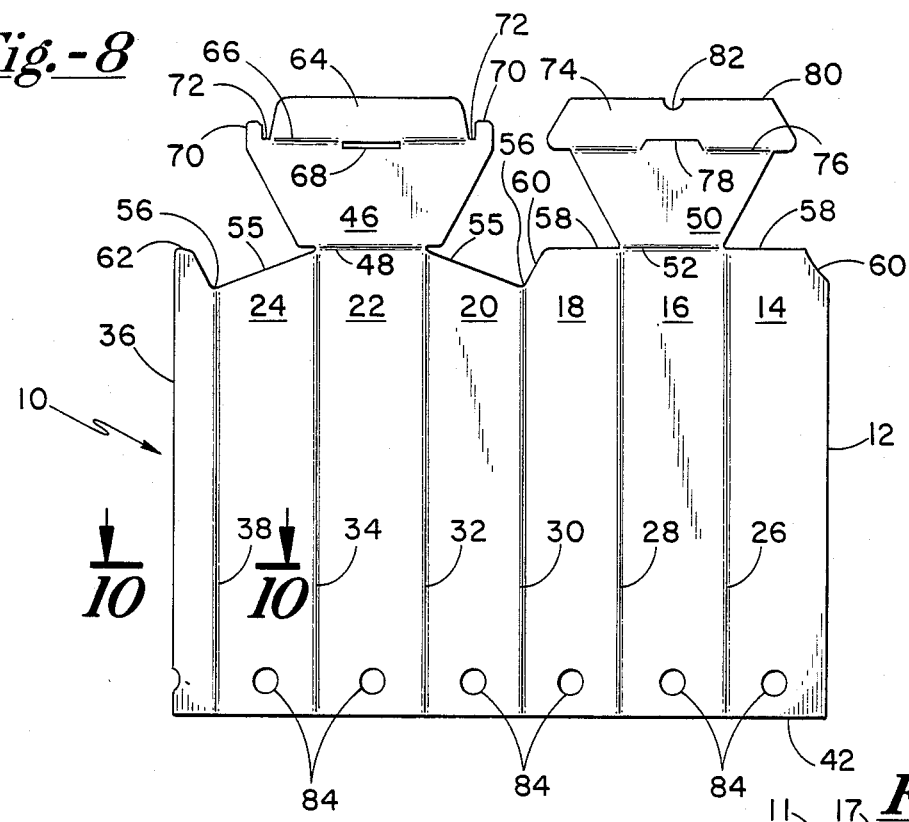
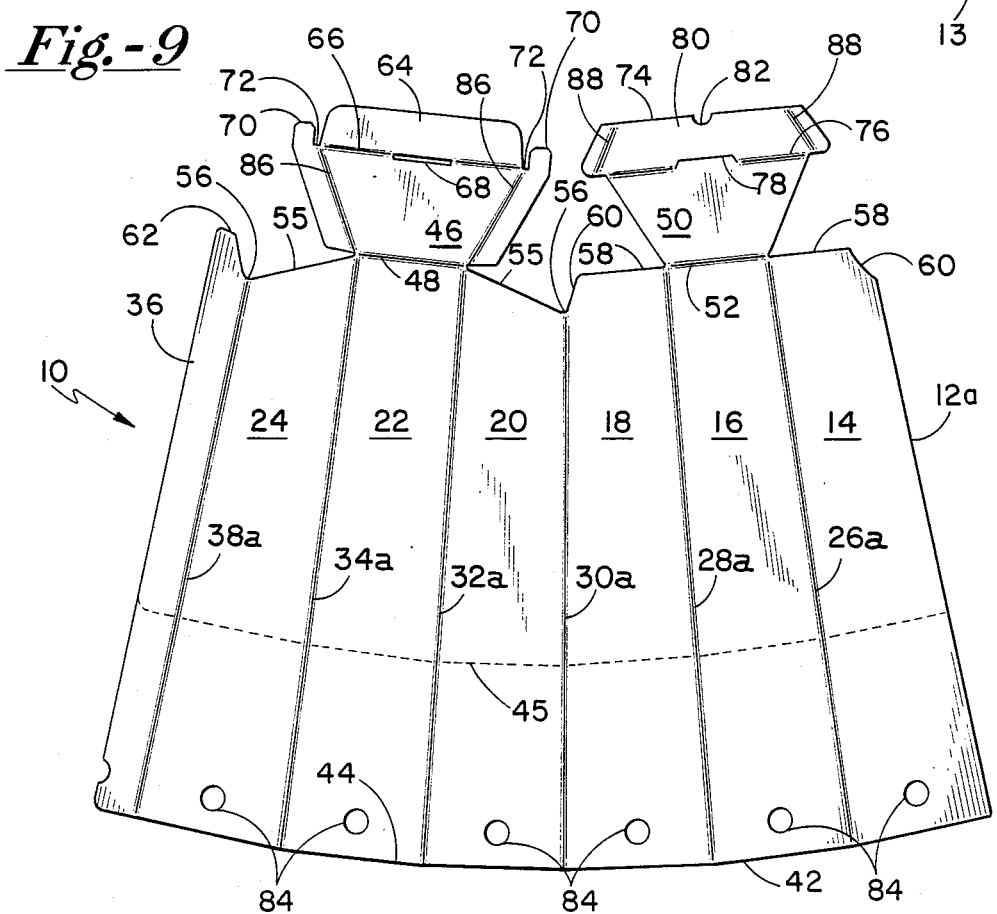

TRANSLUCENT PLANT COVER OF FOLDABLE CONSTRUCTION

BACKGROUND OF THE INVENTION

This invention relates generally to devices for covering growing plants to protect them from the elements, and in particular to a freestanding, insulated cover constructed from corrugated plastic for use in cultivated agricultural fields and farmlands.

Various items have been used to protect plants during their initial stages of growth in the early spring, or from harsh temperatures and frost in the autumn.

Seedlings, bulbs, and shoots are generally started in a greenhouse. Their growing environment may therein be controlled and they are protected from the elements until they reach a size to withstand the weather of early spring or the risk of adverse weather has passed, although this adds considerably to the end cost of the plant, produce, fruit, or blossoms. Plants which are particularly vulnerable to the elements-such as rose bushes or tomatoes-may often be covered with straw, burlap, or leaves in anticipation of frost or snow. Smudge pots are used in the fall to heat orchards where the trees are too large to be covered.

Styrofoam containers ranging from cup to bushel-basket size may be used as plant protectors. Small plants may also be covered with overturned potting containers, baskets, or commercially produced plant covers. Such items tend to be relatively expensive when compared to the end price which may be obtained for the plant or its produce, and it is therefore necessary that the cost of the plant protector be spread over a useful life of many growing seasons, and not add in other ways to the costs of raising those plants.

One product which has been primarily marketed to home gardeners under the trademark "Hot Caps" consists of a dome-like structure molded out of a material similar to wax impregnated paperboard. While inexpensive, this product is still degraded by the elements, and will generally withstand use for only a single season. It is difficult to anchor this product to the ground so that it will not be blown away. Furthermore, this product does not provide any ventilation for the growing plant. Although a user could cut the top off the dome or puncture holes in the side, such measures would prevent the structure from later providing the needed protection for the plant, and present a problem when the plants eventually mature and grow through those holes, then becoming too large to remove. The other available alternative is to set out and retrieve each hot cap daily, a process both impractical and expensive when dealing with a large expanse of agricultural field containing many thousands of plants.

Another device has been shown and described in U.S. Pat. No. 4,267,655 entitled "Double Walled Thermal Protective Coverings." One embodiment of this device has been marketed under the trademark "Wall-O-Water," and is intended for use primarily in the spring to accelerate the normal planting and growing season. This device comprises a plurality of tubes manufactured from a thin, flexible plastic sheeting and fastened together longitudinally. Because the plastic is very thin, rigidity is imparted to the structure by filling each individual tube with water. The tubes may be oriented in either a vertical or horizontal configuration to form side walls of a cylinder or truncated cone which surround the growing plant.

Although this device has proven effective for lengthening the early growing season, as well as accumulating and utilizing solar energy, it does present several drawbacks. Filling each tube with water is a time consuming and tedious process which requires a great deal of stooping or bending over. A water tank having the appropriate nozzle must be driven through the field, and the individual setting up the plant protectors must walk through the field or dismount the vehicle repeatedly.

It is difficult to set up the device and fill the individual tubes because they tend to collapse unless supported by some preexisting frame or structure, and the device may thereby damage delicate plants if handled improperly. Filling each tube alternately with increasing amounts of water to prevent such a collapse proves to be an even more time consuming process. Because the tubes must be individually filled with water and later emptied, and the water is expected to freeze and expand, no provision is made for the tubes to be completely sealed, and enough water may evaporate from the tubes over a short period to weaken the structure.

The only embodiment of the device which permits both ventilation and protection incorporates a drawstring threaded through loops at the top of the tubes. To use this drawstring, however, the tubes must be only partially filled with water. This eliminates any structural integrity which would otherwise hold the top of the cylinder open, and the tubes are free to fold over and close off the opening, thereby preventing any ventilation. Other embodiments of the device prevent ventilation or sunshine from reaching the plant, do not serve to protect the plant from heavy rains, hail, or wind, and require separate internal structures to protect the plant from being crushed by the water filled tubes themselves.

While the tubular plant protector permits an enclosed volume as much as four times greater than the hot caps, and indeed requires such a larger volume to permit the extended growth period which it may ostensibly provide, all the embodiments of the water filled tube design have a limiting maximum size or height above which the structure will crimp and collapse from its own weight.

A water filled plant protector also presents some unique disadvantages in the autumn, when the water increases the liklihood of frost subliming on the leaves of the plant, and retains the nighttime cold when there is no morning sunshine the subsequent day. Additionally, the water which remains trapped in each tube after being emptied keeps the devices from being stored away without drying, itself a difficult process, or leads to mold or mildew if stored improperly.

Although the plastic tubes do permit a longer useful life than the previously mentioned hot caps, they are still only expected to survive a few years of use if they are handled with the utmost of care, and not exposed to the many sharp objects one normally encounters in the field. An inadvertent scrape or blow to the water filled tubes will cause them to tear, and may result in the entire structure collapsing onto the plant. If a protector is damaged, a new protector must be obtained and filled, or a supply of extra protectors and a watering can must be carried each time one goes into the field.

3

BRIEF SUMMARY OF THE INVENTION

It is therefore an object of this invention to design a plant protector which provides structural rigidity and is self-supporting, to both protect the enclosed plant from the elements, and to permit the protector to be easily and quickly erected without the addition of other materials, the need for a preexisting frame, or the use of tools. It is a related object of this invention to design the above plant protector such that it may be collapsed and stored in a minimum of space with little effort.

Irt is a distinct object of this invention to design the above plant protector such that the structural walls of the protector comprise a material which both acts as a thermal insulator, and permits the transmission of a substantial percentage of the incident ultraviolet light rays to foster photosynthesis and utilize the "greenhouse effect," whereby light rays pass through the walls of a structure and strike air molecules therein, thus transferring thermal energy to those molecules which cannot escape the structure, and hence raise the ambient temperature within the structure to a temperature greater than the surrounding environment.

It is an object of this invention to design the above plant protector such that several of the plant protectors may be deposited in a field by a person riding a vehicle, without requiring repeatedly stopping the vehicle and dismounting.

It is another object of this invention to design the above plant protector so that it may be easily and inexpensively manufactured, but will provide unlimited extended re-use.

It is a further object of this invention to design the above plant protector such that it may alternately be opened to provide complete ventilation and unrestricted sunlight, closed to ensure maximum protection and insulation from the harsh elements, or selectively set at an intermediate position to take full advantage of climatic conditions. It is a related object of this invention to design the above plant protector such that a person riding on a vehicle may open and close the plant protector by merely pressing upon its top surface.

It is an additional object of this invention to design the above plant protector such that it will transmit substantial amounts of light to the growing plant, and will yet serve to insulate the plant from the cold without overheating the plant during warm days.

It is yet another object of this invention to design the above plant protector such that it may be simply anchored to the ground.

It is a still another object of this invention to design the above plant protector such that it may be manufactured in a wide variety of sizes and shapes without diminishing the structural integrity of the plant protector, and may be manufactured in sizes sufficient to protect different types of plants or several small plants at one time. It is a related object of this invention to design the above plant protector such that the user may alter the overall size of the plant protector, or may initially select from a prescored unit a constructed size suitable for the desired plants.

Briefly described, the plant protector of this invention is a structure folded from a sheet of corrugated plastic which is cut and scored into a unitary blank. The general form of the preferred embodiment is a six-sided hexagonal column having generally upright side panels, and a pair of pivotably hinged lid panels. The adjoining side panels are connected across scored fold lines, while the opposing sides may be fastened together using thermal welds or other fasteners. Anchoring apertures are located near the bases of the side panels.

Ventilation is provided through the pair of hinged lid panels, which may be folded inward and locked, or unlocked and unfolded by downward pressure thereon.

These and other objects and advantages of the invention will be readily understood as the following description is read in conjunction with the accompanying drawings, wherein like reference numerals have been used to refer to like elements throughout the several views.

BRIEF DESCRIPTION OF THE DRAWINGS

FIG. 1 is a perspective view of the plant protector of this invention in the upright, assembled position with the lid panels completely closed;

FIG. 2 is a perspective view of the plant protector shown in FIG. 1 with the lid panels partially folded inward;

FIG. 3 is a perspective view of the plant protector shown in FIG. 1 with the first lid panel flexed;

FIG. 4 is a perspective view of the plant protector shown in FIG. 1 with the first lid panel folded completely inward;

FIG. 5 is a perspective view of the plant protector shown in FIG. 1 with the second lid panel folded completely inward;

FIG. 6 is a perspective view of the plant protector shown in FIG. 1 with both lid panels in the closed position, and indicating how pressure may be placed upon first lid panel to unlock the lid;

FIG. 7 is a perspective view of the plant protector shown in FIG. 1 in use, with a plant growing through the opened lid panels;

FIG. 8 is a plan view of the cut and scored blank from which the embodiment of the plant protector shown in FIG. 1 is formed;

FIG. 9 is a plan view of the cut and scored blank from which the plant protector having a selectable size and a modified lid panel configuration is formed; and FIG. 10 is a fragmentary section view of one of the protector wall panels, taken through lines 10—10 of FIG. 8.

DESCRIPTION OF THE PREFERRED EMBODIMENTS

Embodiments of the plant protector of this invention are shown in FIGS. 1-9 and referenced generally by the numeral 10.

Referring to FIGS. 8 and 9, a unitary blank 12, 12a is cut from a larger sheet of corrugated plastic as shown. As shown in FIG. 10, the corrugated plastic sheet is formed from three plys of corrugtated plastic, two planar plys 11 and 13 encasing and adhered to the central convoluted ply 15, with the grain of the sheet defined by the linear direction of the convolutions which form longitudinal air pockets 17 within the corrugated plastic. The corrugated plastic is preferrably translucent, and ideally of a plastic resin which transmits a substantial percentage of incident ultraviolet light rays, to permit the "greenhouse effect" to be utilized. A high density poly-ethylene has proven suitable in these regards.

The blanks 12, 12a is scored to form six wall panels 14, 16, 18, 20, 22, 24 which are hingedly connected consecutively across scored fold lines 26, 28 30, 32, 34, respectively. A thin end closure flap 36 may be hingedly connected to one of the end wall panels 14, 24 across a scored fold line 38. The wall panels 14, 16, 18, 20, 22, 24 are sequentially folded upward and inward to form the generally upright, self-supporting column as shown in FIG. 2. The end closure flap 36 is folded in overlapping, abutting relation to the opposing end wall panel 14 or 16, and fastened thereto using thermal welds, staples, or any other suitable fastener 40. The end closure flap 36 and fastener thereby form a connection means to connect the opposing end wall panels 14 and 24 together to complete the generally upright, self-supporting column.

In the embodiment shown in FIG. 8, the fold lines 26, 28, 30, 32, 34, and 38 are generally parallel to one another, and the erected plant protector 10 assumes the shape of a generally straight hexagonal column having substantially vertical sides when folded to its upright position as shown in FIG. 1.

In the embodiment shown in FIG. 9, the fold lines 26a, 28a, 30a, 32a, 34a, and 38a, if extended beyond the boundary of the blank 12a, would represent segments of lines diverging from a generally common intersection or perspective point located beyond the boundary of the blank 12a, such that the erected plant protector 10 assumes the shape of a generally tapered hexagonal column having sloping vertical sides when folded to its upright position.

In each embodiment, the side panels 14, 16, 18, 20, 22, 24 extend longitudinally downward to the base 42 of the protector 10 defined by the lower edge 44 of the blank 12, 12a or each panel 14, 16, 18, 20, 22, 24 may be foreshortened by disconnecting a portion of some or all of the wall panels 14, 16, 18, 20, 22, 24 along the adjustment line 45 to vary the size of the protector 10. Several adjustment lines 45 may be marked or perforated such that the ultimate user may select the desired size of the protector 10 from among a number of prescored sizes. The end closure flap 36 may be adjusted accordingly in a similar manner. In the case of the generally straight-sided embodiment shown in FIG. 8, adjusting the size of the protector 10 will result only in altering the height of the protector relative to the ground. In the case of the generally tapered embodiment shown in FIG. 9, adjusting the size of the protector 10 will result not only in altering the height of the protector 10, but will increase or decrease the area defined by the base 42 of the container. While the volume of the straight-sided embodiment of the protector 10 may thereby be adjusted linearly with incremental changes in height, the volume of the tapered embodiment will be adjusted by a proportional factor dependent upon the slope of the sides of the protector 10.

The excess portions of the panels 14, 16, 18, 20, 22, 24 which extend below the adjustment line 45 need not be separated completely from the blank 12, 12a but rather the panels 14, 16, 18, 20, 22, 24 may each be separated from one another below the adjustment line 45, with adjustment line 45 comprising a fold rather than a cutting line. The excess portions thereby defined and separated may be folded outwardly across adjustment line 45 to act as anchoring panels which extend outwardly from the base 42 to stabilize the plant protector 10 in the upright position, particularly in situations where the height of the erected protector 10 is several times greater than its width.

Referring to FIG. 8, it is seen that a first lid panel 46 extends from and is hingedly connected to wall panel 22 along scored fold line 48, while a second lid panel 50 extends from and is hingedly connected to wall panel 16 along scored fold line 52. These scored fold lines 48, 52 are generally panellel and define the topmost region of the open top 54 of the protector 10 as seen in FIG. 2.

Referring again to FIG. 8, it is seen that the upper edges 55 of the wall panels 20, 24 adjoining the first lid panel 46 at each end of the fold line 48 incline downwardly in a substantially straight line and terminate at valley points 56 adjacent to fold lines 30, 38. Conversely, top edges 58 of wall panels 14, 18 adjoining the second lid panel 50 at each end of fold line 52 extend outwardly away from the lid panel 50 substantially parallel to and in generally straight paths from fold line 52, and terminate in downwardly depending arcuate shoulders 60. The top edge 62 of the end closure flap 36 forms an arcuate shoulder similar to the arcuate shoulder 60 adjoining the top edge 58 of wall panel 18.

The embodiment as shown in FIG. 9 displays features corresponding to each of those previously described, though each feature adjoins its adjacent couterpart in mirror image relation to the embodiment shown in FIG. 8. Similarly, the upper edges 55 of the wall panels 14, 18 adjoining the first lid panel 46 at each end of the fold line 48 are inclined downwardly in a substantially straight line and terminate at valley points 56 adjacent to fold lines 30a, 38a, although the top edges 58 of the wall panels 20, 24 need not extend parallel to or in a generally straight path from fold line 52.

When the protector 10 is folded to its upright erected position, with the end closure flap 36 fastened to the end panel 14, the top edges 55, 58, 60, 62 and the folded lines 48, 52 define the open top 54 of the plant protector 10. The shape of the open top 54 may be visualized as a contour or surface taking the form of a three sided plateau defined by edges 58 and fold line 52, that plateau adjoining a depending shoulder region defined by shoulders 60 and terminating at a valley defined by valley points 56, and an inclined edge region defined by the opposing edges 55 and fold line 48, the inclined edge region opposing the plateau region across the valley and sloping downward toward the valley points 56.

The first lid panel 46 has a first lid flap 64 extending from and hingedly connected thereto along a scored fold line 66. The first lid panel 46 also defines a rectangular aperture 68 having one longitudinal side thereof parallel to and in common with the fold line 66, as seen in FIG. 8. The first lid panel 46 further has a pair of side tabs 70 extending from the first lid panel 46 and separated from fold line 66 by guide notches 72 which are recessed inward between the side tabs 70 and the first lid flap 64, and are approximately as wide as the thickness of the corrugated plastic used to form the protector 10.

The second lid panel 50 similarly has a second lid flap 74 extending from and hingedly connected thereto along scored fold line 76, a portion of that fold line 76 being cut entirely through the surface of the lid flap 74 to define a locking tab 78 approximately as wide as the rectangular aperture 68 as shown in FIG. 8. The second lid flap 74 extends outwardly on each side of the lid panel 50 beyond the ends of the fold line 76, and the top edge 80 second lid flap 74 further defines a finger positioning notch 82 at the center point of that top edge 80.

To erect the plant protector 10, the wall panels 14, 16, 18, 20, 22, 24 are sequentially folded and fastened as previosly described to form the generally upright straight or tapered hexagonal colunn having an open top 54 as shown in FIG. 2. Referring to FIG. 3, the first lid panel 46 is folded inwardly, and the first lid flap 64 is folded downward in relation to the first lid panel 46.

The first lid panel 46 is then folded downward until the guide notches 72 slidably receive the depending shoulders 60, and the first lid panel 46 contacts inclined edges 55 and covers the inclined edge of the open top 54, with the first lid panel 46 itself sloping downward toward the valley points 56 which receive the first lid flap 64 therebetween, as seen in FIG. 4. The second lid panel 50 is then folded inwardly and downward as shown in FIG. 5 such that the lid panel 50 is received within and below the plateau region defined by top edges 58 and fold line 48, and further downward until the locking tab 78 is received within the rectangular aperture 68. The second lid flap 74 is thereby flexed upwardly by, and remains in abutting contact with, the first lid panel 46 as shown in FIGS. 1 and 5. In this manner, the open top 54 of the plant protector 10 may be closed to protect the enclosed plant by pivoting the lid panels 46, 50 to a closed position substantially covering the open top 54. The location of the locking tab 78 and rectangular aperture 68 may be altered or exchanged between the lid panels 46, 50.

To unlock and open the plant protector 10, finger pressure is exerted downward upon the first lid panel 46 at a point indicated by the finger positioning notch 82. Continuing to apply pressure at this point will release the locking tab 78 from the rectangular aperture 68 and permit the lid panel 50 to pivot to the open position to permit ventilation and watering. Although both lid panels 46, 50 may be opened for ventilation or to allow the plant to grow through the top of the protector 10, opening only the second lid panel 50 using the one-finger pressure method described permits a person to rapidly open or close a large number of protectors 10 while walking or riding past the row of protectors 10.

A series of anchor apertures 84 as shown in FIG. 8 may be placed near the base edge 42 of the protector 10, such that stakes or anchor rods (not shown) may be inserted through the anchor apertures 84 and into the ground to prevent the protectors from being toppled or blown away. By securing the protectors 10 in this manner, the plants may be allowed to continue growing through the open top of the protector 10. The protector 10 may thus replace traditional stakes used to hold the matured plant upright, and will help to protect the plant from damaging wind storms normally occuring in the late spring.

Side fold lines 86, 88 as shown in FIG. 9 may be added to the first lid panel 46 and second lid flap 74 such that less pressure is required to open and close the protector 10, and to prevent the protector closure from buckling under pressure, which would allow excess moisture to enter the protector 10.

The connection means may also comprise one or more locking tabs (not shown) designed to be slidably received within corresponding aligned slots or apertures (not shown) extending entirely through the surface of the closure flap 36 or opposing end panel 14, 24 along the fold line 38, 38a. In such a configuration, the closure flap 36 is folded to overlap and make abutting contact with the interior side of the opposing end wall panel 14, 24 such that the slots or apertures are exposed, and the tabs may be inserted therethrough.

While the preferred embodiments of this invention include a pair of lid panels 46, 50 attached to wall panels 16, 22 situated on opposing sides of the upright column, a similar result may be obtained by attaching a single foldably scored lid panel to one wall panel, and pivoting that lid panel to a closed position disposed over the open top 54 of the protector 10, with a locking tab 78 extending from the edge of the lid panel and being received within an aligned aperture in the appropriate wall panel opposing the wall panel to which the lid is hingedly connected. A pressure release lock may be formed by placing the locking tab and aligned aperture at an angle or bias in relation to the open top 54 of the protector 10, such that downward pressure on the lid would slide the tab out of the aperture. As that pressure were released, the tab would not slide back into the aperture since it is oriented at an angle to the aperture. Such an embodiment is less desirable due to the excess material consumed in the layout of larger sheets of raw material from which the blanks 12 are cut.

While the preferred embodiments of the present invention have been described, it should be recognized that various changes, adaptations, and modifications may be made therein without departing from the spirit of the invention and scope of the appended claims.

What is claimed is:

1. A protector for placing on the ground to cover a growing plant, said protector comprising:
a plurality of wall panels, each said wall panel extending from and being hingedly connected to another of said wall panels along scored fold lines such that said wall panels form a generally upright self supporting column when folded across said fold lines, the top edges of the wall panels of the column form an open top, said open top defining a plateau region, a depending shoulder region adjoining said plateau region and extending downward to a valley region from said plateau region, and an inclined edge region adjoining said valley region and opposing said plateau region, said inclined region inclining downward toward said valley region; and
at least one lid panel, each said lid panel extending from and being hingedly connected to the top edge of one said wall panel, such that at least one said lid panel may be selectively pivoted between a closed position substantially covering said open top and an open position substantially displaced from said closed position, whereby the protector folded to its generally upright position may be placed over the growing plant with at least one lid panel being selectively opened or closed to permit ventilation or provide protection from the plant.

2. The protector of claim 1 wherein the lid panels comprise a first lid panel and a second lid panel, the first lid panel being hingedly connected to the wall panel opposing the wall panel to which the second lid panel is hingedly connected such that the lid panels may pivot inwardly in opposing and confronting relation to one another, the first lid panel defining an aperture and the second lid panel having a locking tab extending therefrom, said locking tab being positioned to be received within said aperture when the lid panels are pivoted to the closed position.

3. the protector of claim 2 wherein each wall panel has a top edge, with the lid panels being hingedly connected to the top edges of two of said opposing wall panels and the lid panels inclining generally downwardly therefrom when the lid panels are pivoted to the closed position.

4. The protector of claim 3 wherein at least a portion of the second lid panel overlaps and contacts a portion of the first lid panel when the lid panels are pivoted to the closed position.

5. The protector of claim 1 wherein the wall panels are consecutively connected to present two opposing end wall panels, said protector further comprising:
connection means for connecting the two opposing end wall panels together.

6. The protector of claim 5 wherein the connection means further comprises:
a closure flap extending from and hingedly connected to one of the end wall panels along a scored fold line, said closure flap being foldable in overlapping and abutting relation to the opposing end wall panel and fastenable thereto when the protector is folded to its upright position.

7. The protector of claim 1 wherein the number of lid panels is two, one of the lid panels being pivotable between a closed position substantially covering the inclined edge of the open top and an open position, and one of the lid panels being pivotable between a closed position substantially covering the open top bounded by the plateau region and an open position.

8. The protector of claim 7 wherein the lid panel covering the plateau region is received within the plateau region of the open top.

9. The protector of claim 7 wherein the lid panel covering the inclined edge region further comprises:
at least two side tabs extending from the lid panel, said side tabs and the lid panel covering the inclined edge region defining one or more guide notches therebetween, said guide notches positioned to slidably receive and engage the depending shoulder region opposing the sloping edge region when the lid panel covering the inclined edge region is pivoted to the closed position substantially covering the inclined edge region.

10. The protector of claim 9 wherein the lid panel covering the inclined edge region has side edges, each of the side tabs extending from said side edge and defining the guide notch therebetween, said lid panel further comprising:
a pair of scored fold lines, each said fold line extending parallel to the side edge of the lid panel from a point adjacent the guide notch defined by the side tab extending from and connected to the side edge.

11. The protector of claim 7 further comprising:
a locking tab extending from the lid panel covering the plateau region; and
an aperture defined by and extending entirely through the surface of the lid panel covering the inclined edge region, said aperture being positioned to align with and slidably and engagingly receive said locking tab.

12. The protector of claim 7 further comprising:
a lid flap, said lid flap extending from and hingedly connected to the lid panel covering the plateau region along a scored fold line, said lid flap being folded generally upwardly along said fold line in abutting contact with the lid panel covering the inclined edge region.

13. The protector of claim 12 wherein the lid flap has a pair of side edges, the lid flap further comprising:
a pair of scored fold lines, each said fold line extending parallel to the side edge of lid flap.

14. The protector of claim 7 further comprising:
a lid flap, said lid flap extending from and hingedly connected to the lid panel covering the inclined edge region along a scored fold line, said lid flap being folded generally downwardly along said fold line in abutting contact with the lid panel covering the plateau region.

15. The protector of claim 14 wherein the lid panel has a pair of side edges, the lid panel further comprising:
a pair of scored fold lines, each said fold line extending parallel to the side edge of the lid panel.

16. The protector of claim 1 wherein the wall panels are generally planar, the number of wall panels is six, and the shape of the generally upright structure is a straight-sided hexagonal column.

17. The protector of claim 1 wherein the wall panels are generally planar, the number of wall panels is six, with two or more of the fold lines along which the wall panels are hingedly connected being non-parallel such that the shape of the generally upright structure is a tapered hexagonal column.

18. The protector of claim 1 further comprising:
at least one adjustment line extending across the surface of the wall panels, said adjustment line being scored into the surface of the wall panels such that a portion of the wall panels may be separated along said adjustment line and disconnected from the protector.

19. The protector of claim 1 wherein the protector is folded from a unitary blank cut from a single sheet of material.

20. The protector of claim 1 wherein the material from which the protector is formed is corrugated plastic.

21. The protector of claim 1 wherein the material from which the protector is formed is high density polyethylene.

22. The protector of claim 1 wherein the material used to form the protector is substantially translucent, and wherein said material transmits a substantial percentage of incident ultraviolet light rays.

* * * * *